No. 786,459. PATENTED APR. 4, 1905.
E. A. NORDLINDH.
ROTATING OR CENTRIFUGAL CHURN.
APPLICATION FILED FEB. 8, 1904.
3 SHEETS—SHEET 1.
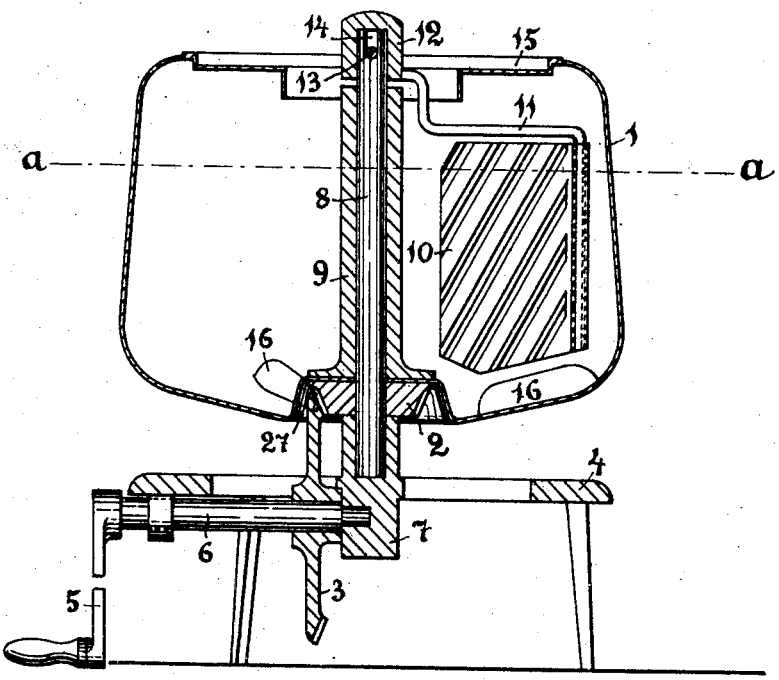
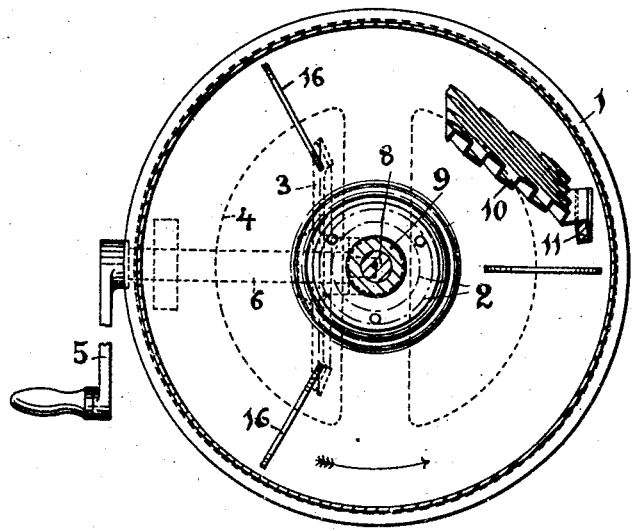
Witnesses. Inventor No. 786,459. PATENTED APR. 4, 1905.
E. A. NORDLINDH.
ROTATING OR CENTRIFUGAL CHURN.
APPLICATION FILED FEB. 8, 1904.
3 SHEETS—SHEET 2.
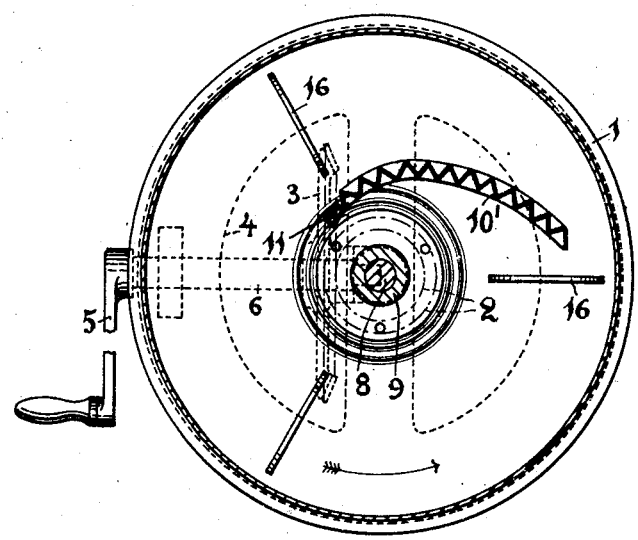
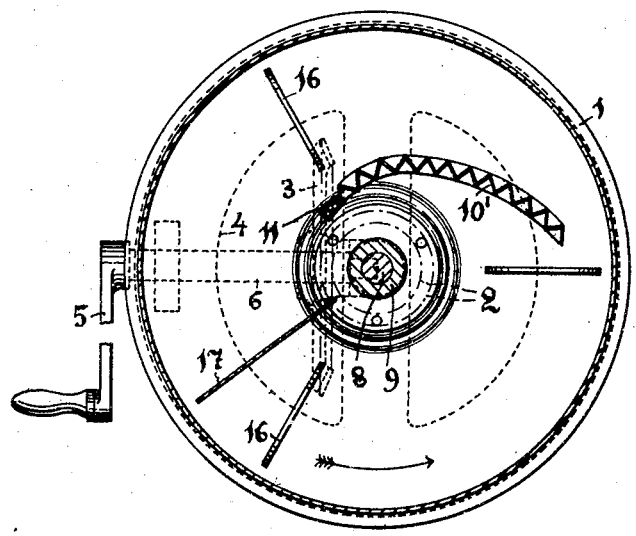
Witnesses.
Inventor
Ernst Albin Nordlindh No. 786,459. PATENTED APR. 4, 1905.
E. A. NORDLINDH.
ROTATING OR CENTRIFUGAL CHURN.
APPLICATION FILED FEB. 8, 1904.
3 SHEETS—SHEET 3.
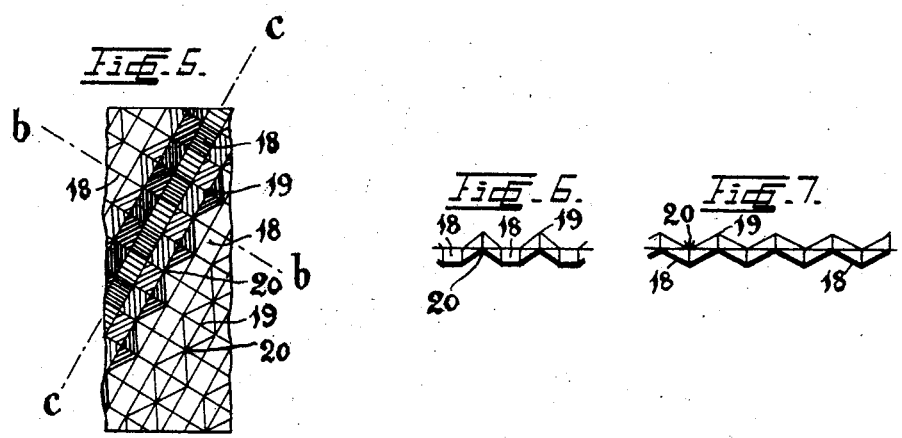
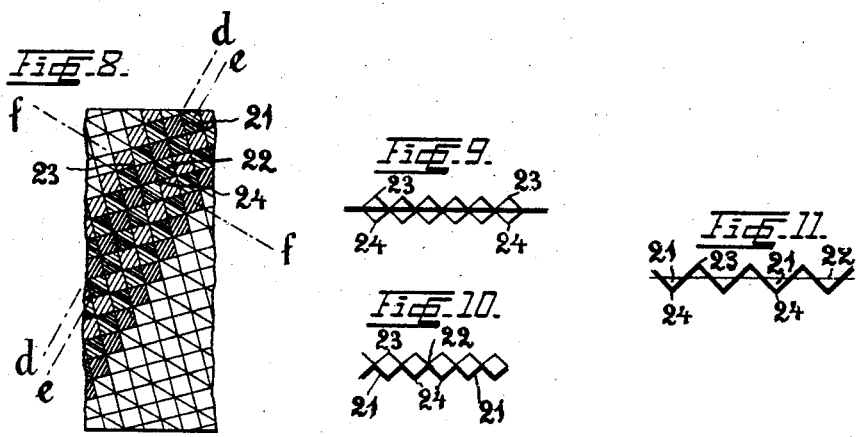
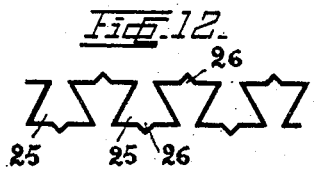
Witnesses.
L. Faldman
C. Heymann.
Inventor
Ernst Albin Nordlindh
by B. Singer
atty.

No. 786,459.

Patented April 4, 1905.

UNITED STATES PATENT OFFICE.

ERNST ALBIN NORDLINDH, OF STOCKHOLM, SWEDEN, ASSIGNOR TO SVENSKA CENTRIFUG AKTIEBOLAGET, OF STOCKHOLM, SWEDEN.

ROTATING OR CENTRIFUGAL CHURN.

SPECIFICATION forming part of Letters Patent No. 786,459, dated April 4, 1905.

Application filed February 8, 1904. Serial No. 192,594.

*To all whom it may concern:*

Be it known that I, ERNST ALBIN NORDLINDH, engineer, a subject of the King of Sweden and Norway, residing at Stockholm, Sweden, (whose post-office address is Stora Vattugatan 5, Stockholm, Sweden,) have invented certain new and useful Improvements in Rotating or Centrifugal Churns; and I do declare the following to be a full, clear, and exact description of the invention, such as will enable others skilled in the art to which it appertains to make and use the same.

My invention relates to centrifugal churns wherein moving and stationary bodies coöperate in opposition to each other in effecting reduction of the cream. Heretofore in churns of this nature a rotatable containing-body and stationary insets have been used, the latter engaging and momentarily intercepting the flow of the cream effected by the operation of the containing-body. When the containing-body is rotatable, centrifugal force causes most of the cream normally to gather and travel at a point near the periphery of the containing-body. Therefore intercepting-partitions have been utilized to engage the cream near the periphery of the churn-body and direct it toward the center thereof. Agitation of the cream thus effected has heretofore been materially increased by providing the intercepting-partitions with grooved engaging faces, which serve to deflect the cream promiscuously in directions angular to its main course. While this means has proved efficacious to a certain extent, it will be obvious that a mere direction of the course of liquid in a rotating body will not serve effectively to actually change the flow of the liquid against the constant resistance of centrifugal force unless the intercepting-partitions are very numerous and are positioned closely adjacent each other. A churn thus encumbered would not only be awkward to handle and expensive to make, but it would be difficult to clean and effect removal of the butter therefrom.

In my improved churn reliance is not placed upon means merely serving to direct the flow of cream in one direction or another; but the cream is engaged and positively guided from the periphery of the churn-body to the axis thereof, where it is caused to "spout" or form a liquid column about said axis. Independent means having a stationary mounting serves to engage the liquid spout formed and cause the same to flow tangentially with respect to the rotating body. Thus a continuous angular movement of the cream is effected in opposition to the flow caused by centrifugal force, resulting in vigorous and constant agitation of the cream and a consequently rapid and uniform reduction of the same to butter My invention will be more particularly described by reference to the accompanying drawings and will be more fully pointed out in the appended claims.

Figure 1 shows a vertical central section of the churn and its frame. Fig. 2 shows a sectional view of the churn on line *a a* of Fig. 1. Fig. 3 is a view similar to Fig. 1, showing a modified form of internal parts of the churn. Fig. 4 is a similar view showing a further modification of the internal mechanism. Fig. 5 shows a side view of a still further modification of internal parts. Figs. 6 and 7 are sectional views on the lines *b b* and *c c* of Fig. 5. Fig. 8 shows another modification of the wing or inset. Figs. 9, 10, and 11 show, respectively, sectional views on lines *d d*, *e e*, and *f f* in Fig. 8. Fig. 12 shows a top view of a modification of internal parts differing from those previously described.

1 designates the rotary churning-bowl, in the bottom of which a depression 27 is formed, wherein a bevel-wheel 2 is housed. Said wheel 2 meshes with another bevel-wheel, 3, on shaft 6, which latter is journaled in the frame 4. A crank 5 is provided and preferably mounted on the shaft 6, by means of which crank the bowl is rotated. A centrally-disposed part 7 serves to support a fixed shaft 8. Said shaft 8 passes through the gear 2 and is journaled in the member 7, which latter forms a support for the churn-body 1. In order to prevent the liquid from coming into contact with the said rod or pivot 8 and to insure greater evenness in the running of the bowl, the pivot is inclosed by a sleeve 9, fastened to the bottom of the bowl. An inset 10 is provided and preferably held by means of a suitably-bent arm 11 and preferably by means of a cap 12, carried by the pivot 8. In order to hold the inset 10 in a fixed position, a pin 13, mounted in a groove 14, preferably passes through an aperture in the cap 12, thereby anchoring said member 10 in a non-rotatable position. By withdrawing the pin 13 and the cap 12 the wing 10 may be easily removed from the bowl 1 when it is desired to clean the same. The wing 10 can be located in any desired position with respect to the arm 11 when the parts are first assembled. In Fig. 2 the wing 10 is shown inclined both horizontally and vertically. The said inset or wing 10 preferably consists of a plate corrugated so as to form vertical, oblique, or zigzag grooves or channels, which in addition to the position of the inset serves effectively to direct a portion of the liquid toward the center of the bowl or in a direction opposite to that in which the centrifugal force would direct said liquid. A great portion of the liquid, however, is forced to flow across the ridges forming the grooves or channels, being powerfully dashed against the same, so that a violent stirring and circulation of the mass is obtained. In order to increase the efficiency of the churn, two or more wings 10 may be inserted in the bowl.

In the form of construction illustrated in Figs. 3 and 4 the inset consists of a plate 10', which is bent in the form of a logarithmic spiral and is also provided with grooves. The object of this form is to catch or intercept the cream rotating with the bowl, (in the direction indicated by the arrow,) and thereby bring the said cream toward the center in order to effect a constant alternating movement and promote the formation of butter. When the cream has by means of the inset 10' been caused to form a column in the center, the centrifugal force will tend to throw it toward the periphery. If the part of the inset 17 adjacent the center be brought within the periphery of the column of liquid, such a column will be prevented from forming beyond a prescribed size in consequence of its being caught by the wing 17. The wing 17 can obviously be given many different forms, and therefore only a few forms are mentioned here.

In the form of the wing shown in Figs. 5, 6, and 7 channels have been provided on both sides of the plate. In this construction the said channels, which are to form passages for the cream, extend in a zigzag fashion, so that the cream in its passage through said channels meets with constant resistance. The upper line of the lateral edges of the channels also run in a zigzag manner and are designated by the numeral 19 and the corresponding lower points by 20.

Fig. 8 shows still another modification of forms previously described and will be more clearly understood by reference to Figs. 9, 10, and 11. The section on line $e\ e$ shows the direction of the channels. Fig. 10 shows how the bottoms of said channels run up and down in zigzag. In Fig. 11 the depth of the same is shown, in which 23 designates the upper ridges and 24 the lower ridges. 22 shows the edges or ridges forming the upper elevations near the bottom. 21 denotes the bottom of the channel itself. When the cream is driven forward through these comparatively deep channels, it will be conducted through the same, the said cream encountering strong frictional resistance in consequence of said ridges 22.

Fig. 12 shows a top view of a form having comparatively deep channels 25, which are capable of holding a large quantity of cream. The grooves or secondary compound channels 26 serve a double purpose—viz., partly to further contribute to the leading of the cream through the channels and partly to hinder the frictional action against the particles passing transversely through the channels.

In consequence of the compound movement to which the liquid is subjected—that is to say, partly the movement toward the bottom of the bowl, from where it is carried by the centrifugal force toward the periphery of the bowl, and partly by the movement in a direction perpendicular to the ridges of the wing—such an effective working of the liquid is obtained as to effect a very rapid and uniform reduction of the cream. To the bottom of the bowl are fixed blades 16, which still further promote the formation of butter.

Having now described my invention, what I claim, and desire to secure by Letters Patent, is—

1. In a churn, the combination with a revoluble bowl portion, an intercepting grooved wing rigidly mounted, said wing having a logarithmic spiral formation, and coöperating stationary wings radially disposed within said bowl and having flat engaging faces, substantially as described.

2. In a churn, the combination with a revoluble bowl portion, an intercepting grooved wing rigidly mounted, said grooves being of a compound formation, said wing having the form of a logarithmic spiral, and coöperating stationary wings radially disposed within said bowl and having flat engaging faces, substantially as described.

3. In a churn, the combination with a revoluble bowl portion, an intercepting wing rigidly mounted and having grooves therein, said grooves having a compound formation, and coöperating stationary wings radially disposed within said bowl, substantially as described.

In testimony whereof I affix my signature in presence of two witnesses.

ERNST ALBIN NORDLINDH.

Witnesses:
HILDUS HÅKANSON,
SIGRID OLSSON.